United States Patent [19]

Halasa et al.

[11] Patent Number: 5,307,850
[45] Date of Patent: May 3, 1994

[54] PNEUMATIC TIRE CONTAINING SYNDIOTACTIC 1,2-POLYBUTADIENE

[75] Inventors: Adel F. Halasa, Bath; Wen-Liang Hsu, Copley, both of Ohio; Richard M. Scriver, Madison, Conn.

[73] Assignee: The Goodyear Tire & Rubber Company, Akron, Ohio

[21] Appl. No.: 695,859

[22] Filed: May 6, 1991

Related U.S. Application Data

[63] Continuation-in-part of Ser. No. 473,133, Jan. 30, 1990, abandoned, which is a continuation of Ser. No. 243,967, Sep. 14, 1988, abandoned.

[51] Int. Cl.$^5$ ............... B60C 1/00; B60C 11/00; B60C 9/18
[52] U.S. Cl. ................ 152/209 R; 152/532; 152/537
[58] Field of Search ......... 152/458, 557, 532, 209 R; 524/495, 533; 525/236, 237; 526/136, 335

[56] References Cited

U.S. PATENT DOCUMENTS

| | | |
|---|---|---|
| 3,516,465 | 1/1968 | Guyot . |
| 3,913,652 | 10/1975 | Imamura et al. . |
| 4,215,021 | 7/1980 | Ogawa et al. . |
| 4,274,462 | 6/1981 | Ogawa et al. . |
| 4,396,052 | 8/1983 | Ahagon et al. . |
| 4,483,381 | 11/1984 | Scriver . |
| 4,742,137 | 5/1988 | Ono et al. . |
| 4,790,365 | 12/1988 | Sandstrom et al. . |
| 4,902,741 | 2/1990 | Burroway et al. ............ 526/93 X |
| 5,021,381 | 6/1991 | Burroway et al. ............ 502/117 |

FOREIGN PATENT DOCUMENTS 0359694  3/1990  European Pat. Off. .

*Primary Examiner*—Michael W. Ball
*Assistant Examiner*—Adrienne C. Johnstone
*Attorney, Agent, or Firm*—Alvin T. Rockhill

[57] ABSTRACT

The subject invention discloses a pneumatic rubber tire comprised of a toroidal shaped fabric-reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass where the rubber of said belt is comprised of (A) from about 25 to about 75 weight percent of a highly dispersed blend of syndiotactic 1,2-polybutadiene in synthetic polyisoprene, (B) from about 25 to about 75 weight percent natural rubber, and (C) from 0 to about 40 weight percent polydiene rubbers other than natural rubber. The present invention also reveals the utilization of syndiotactic 1,2-polybutadiene containing rubber compounds in and around the edges of the belt plies as a gum layer and in undertread gum layers. In the practice of the subject invention, it is important for the syndiotactic 1,2-polybutadiene to be highly dispersed throughout the rubber compound. For this reason, syndiotactic 1,2-polybutadiene which is made by inverse phase polymerization is highly preferred.

13 Claims, No Drawings

PNEUMATIC TIRE CONTAINING SYNDIOTACTIC 1,2-POLYBUTADIENE

This is a continuation-in-part of U.S. application Ser. No. 07/473,133, filed Jan. 30, 1990, now abandoned, which is a continuation of U.S. application Ser. No. 07/243,967, filed Sep. 14, 1988, now abandoned.

BACKGROUND OF THE INVENTION

Pneumatic tires are sometimes constructed with a circumferential belt reinforcement positioned in their crown portion between tread and carcass. Such construction is often used with radial ply carcass tires and sometimes with bias ply tires.

The belt is typically a fabric-reinforced rubber in the form of a rubber encapsulated textile fabric, or multiple filament, such as steel, glass, nylon, aramid or polyester.

The belt reinforcement is used, for example, to control or limit the outward expansion or deformation of the tire in service, to provide some stability for the overall tire construction and to aid in providing a strengthening interface between the carcass plies and tread rubber.

Another and important purpose is to limit the distortion, or squirming, of the tread element as the tire rotates across a substrate (the ground or pavement, for example) and the tread passes through its footprint against the substrate. At this point of contact, a considerable and continuing flexing and distortion of the tire is observed in the region of the footprint. Belt reinforcement resists such distortion at the footprint which usually results in better tread wear characteristics.

High performance tires typically also have one or more overlay layers which are positioned between the belt reinforcement and the tread. Such overlay layers can be made utilizing a wide variety of materials with nylon being among the most common. Such overlay layers improve the tire's performance characteristics but are expensive to apply and add significantly to the cost of the tire.

SUMMARY OF THE INVENTION

By utilizing the techniques of this invention, the high speed performance of tires can be greatly improved. In fact by utilizing the technique of this invention, it is possible to eliminate overlay layers from tires without sacrificing performance characteristics. The present invention more specifically deals with the use of syndiotactic 1,2-polybutadiene (SPBD) in and around the edges of the belt plies as a gum strip, as an undertread layer (tread cushion), and in the rubber composition utilized in fabric reinforced belts.

The subject invention more specifically discloses a pneumatic rubber tire comprised of a toroidal shaped fabric-reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass where the rubber of said belt is comprised of (A) from about 25 to about 75 weight percent of a highly dispersed blend of syndiotactic 1,2-polybutadiene in synthetic polyisoprene, (B) from about 25 to about 75 weight percent natural rubber, and (C) from 0 to about 40 weight percent polydiene rubbers other than natural rubber.

The subject invention also reveals a pneumatic tire comprised of a toroidal shaped fabric-reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass and an undertread gum layer positioned between said tread and said belt where the undertread gum layer is comprised of (A) from about 25 to about 75 weight percent of a highly dispersed blend of syndiotactic 1,2-polybutadiene in polyisoprene, (B) from about 25 to about 75 weight percent natural rubber, and (C) from 0 to about 40 weight percent polydiene rubbers other than natural rubber.

The present invention further reveals a pneumatic rubber tire comprised of a toroidal shaped fabric-reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass with gum strips around the edges of the belts where the gum strips are comprised of (A) from about 25 to about 75 weight percent of a highly dispersed blend of syndiotactic 1,2-polybutadiene in synthetic polyisoprene, (B) from about 25 to about 75 weight percent natural rubber, and (C) from 0 to about 40 weight percent polydiene rubbers other than natural rubber.

DETAILED DESCRIPTION OF THE INVENTION

The syndiotactic 1,2-polybutadiene (SPBD) used in the practice of the subject invention normally has more than 70% of its monomeric units in a syndiotactic 1,2-configuration. In most cases the SPBD used in the practice of this invention will have at least about 90% of its monomeric units in the syndiotactic 1,2-configuration. The SPBD will generally have a melting point of at least about 160° C. In most cases, it is preferable for the SPBD to have a melting point of at least about 180° C. and it is more preferable for the SPBD to have a melting point of at least about 200° C. It is very important for the SPBD to be highly dispersed throughout the rubbers with which it is being compounded. Highly dispersed blends of SPBD throughout rubbery elastomers can be prepared by utilizing inverse phase polymerization. Such blends of SPBD with the rubbery elastomer can then be further compounded to obtain rubber blends which are useful in the practice of this invention. U.S. patent application Ser. No. 07/892,300 reveals a process for preparing a highly dispersed blend of syndiotactic 1,2-polybutadiene in a rubbery elastomer (synthetic polyisoprene) which comprises (1) polymerizing 1,3-butadiene monomer in an organic solvent under conditions and in the presence of a catalyst which results in the formation of a polymer cement of the syndiotactic 1,2-polybutadiene in the organic solvent, (2) polymerizing at least one diene monomer (isoprene) in the polymer cement under conditions and in the presence of a catalyst which results in the formation of the rubbery elastomer to produce a rubber cement having syndiotactic 1,2-polybutadiene dispersed therein, and (3) recovering the highly dispersed blend of the syndiotactic 1,2-polybutadiene in the rubbery elastomer from the organic solvent in the rubber cement.

A highly dispersed blend of SPBD in polyisoprene can be prepared by polymerizing 1,3-butadiene monomer in a polyisoprene cement in the presence of a catalyst composition which is comprised of: (1) an organometallic compound, (2) a transition metal compound, and (3) carbon disulfide. A detailed description of such catalyst systems is given in U.S. Pat. No. 3,778,424, which is herein incorporated by reference in its entirety.

The transition metal compounds that can be employed in the catalyst composition include: β-diketone complexes of cobalt; β-keto acid ester complexes of cobalt; cobalt solids of organic carboxylic acids; complexes of halogenated cobalt compounds of the formula $CoX_n$, wherein X represents a halogen atom and n represents 2 or 3, with an organic compound; and the like. The organometallic compounds that can be employed in the catalyst composition include: organoaluminum compounds of the formula: $AlR_3$; organolithium compounds of the formula: LiR; organomagnesium compounds of the formula: $MgR_2$ and the like. The preferred organometallic compounds are the organoaluminum compounds of the formula: $AlR_3$ and the organolithium compounds of the formula: LiR.

The catalyst compositions used can be microencapsulated by employing a prereaction process. In this prereaction process the organo-metallic component and the transition metal compound component of the catalyst composition are dissolved in an inert organic solvent with at least one polyene monomer. The ratio of the monomer to the transition metal compound in this catalyst component solution should be at least 1.0 and preferably about 25 by mole. This catalyst component solution is preferably prepared at a temperature of 10° C. to 50° C. and preferably contains 0.0005 to 1.0 percent by mole, more preferably 0.001 to 0.5 percent by mole of the transition metal compound and 0.001 to 10 percent by mole and more preferably, 0.03 to 5 percent by mole of the organometallic compound based on the amount by mole of monomer that will be polymerized in the main polymerization in the cis-1,4-polybutadiene cement.

The polymer produced is composed essentially of syndiotactic 1,2-polybutadiene and generally has a melting point of 70° C. to 210° C. The crystallinity and melting point of the polybutadiene produced by using this process can be controlled by adding hydrocarbon-soluble alcohols, ketones, nitriles, aldehydes or amides to the polymerization mixture.

A catalyst component solution can be prepared by dissolving at least one cobalt compound and at least one organoaluminum compound in an inert organic solvent containing at least one polyene monomer dissolved therein.

The cobalt compound is soluble in the inert organic solvent and is selected from the group consisting of i. β-diketone complexes of cobalt;
ii. β-keto acid ester complexes of cobalt;
iii. cobalt salts of organic carboxylic acid having 1 to 25 carbon atoms, and
iv. complexes of halogenated cobalt compounds of the formula: $CoX_n$ wherein X represents a halogen atom and n represents 2 or 3, with an organic compound selected from the group consisting of tertiary amines, alcohols, tertiary phosphines, ketones and N,N-dialkylamides.

The β-diketone compound to form a complex with a cobalt atom is of the formula:

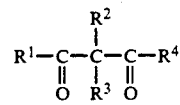

wherein $R^1$ and $R^4$, which are the same as or different from one another, are an alkyl radical of 1 to 6 carbon atoms and $R^2$ and $R^3$, which are the same as or different from one another, are a hydrogen atom or an alkyl radical having 1 to 6 carbon atoms. This type of β-diketone complex of cobalt may be cobalt (II) acetylacetonate or cobalt (III) acetylacetonate.

The β-keto acid ester to form a complex with a cobalt atom may be of the formula:

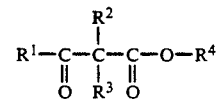

wherein $R^1$, $R^2$, $R^3$ and $R^4$ are the same as defined above. This type of cobalt complex may be a cobalt-acetoacetic acid ethyl ester complex. The cobalt salt of organic carboxylic acid may be either cobalt octoate or cobalt naphthenate.

In the ligand compounds capable of forming a complex with a halogenated cobalt compound, the tertiary amine may be pyridine, triethylamine, tributylamine or dimethylaniline, the alcohol may be methyl alcohol or ethyl alcohol, the tertiary phosphine may be trimethyl phosphine, tributyl phosphine or triphenyl phosphine, the ketone may be acetone or methyl ethyl ketone and the N,N-dialkylamide may be N,N-dimethylformamide, N,N-dimethylacetamide, N,N-diethylformamide or N,N-diethylacetamide. The complex of halogenated cobalt is preferably either a complex of cobalt chloride with pyridine or ethyl alcohol.

The organoaluminum compounds which can be used are of the same types as those which are used in the three component nickel catalyst previously described herein for producing high cis-1,4-polybutadiene.

In the preparation of the catalyst component solution, it is desirable for the cobalt compound and the organoaluminum compound to be dissolved in the inert organic solvent containing at least one polyene. Some polyenes that can be used in the formation of the polyene products used to prepare microencapsulated catalysts are 1,3-butadiene, 1,3-pentadiene, isoprene, myrcene, and 1,5-cyclooctadiene. Polyenes in which at least two of the double bonds are conjugated and which have minimal substitution on the double bonds are preferred, particularly 1,3-butadiene. Other olefins which can be used are those which are capable of serving as chelating agents for transition metals, such as 1,5-cyclooctadiene. Polyenes with neither conjugation nor good chelating potential are much less effective. The polyene is preferably used in a ratio by mole of at least 1.0, more preferably, least 5.0 to the amount by mole of the cobalt compound to be used in the catalyst component solution. The preferred polyenes for use in this invention are 1,3-butadiene, 1,3-pentadiene, isoprene, and myrcene. The most preferred polyene is 1,3-butadiene.

Generally, the larger the ratio of the amount of polyene to the cobalt compound in the catalyst component solution, the higher the activity of the catalyst. However, the activity of the catalyst reaches a maximum value at a ratio by mole of polyene monomer to the cobalt compound used in the catalyst component solution of between 10 and 200. For example, if a molar ratio of polyene monomer to the cobalt compound of 10,000 is employed the activity of the catalyst will be similar to that of the catalyst prepared from a catalyst component solution containing a ratio of polyene monomer to the cobalt compound of from 10 to 200. If the ratio is less than 1.0, the resultant catalyst composition has poor activity.

The catalyst component solution is preferably prepared at a temperature of 10° to 50° C. and preferably contains 0.0005 to 1.0% by mole, more preferably 0.001 to 0.5% by mole, of the cobalt compound. 0.001 to 10% by mole, more preferably, 0.03 to 5% by mole of the organoaluminum compound based on the amount by mole of 1,3-butadiene to be polymerized. The ratio by mole of the organoaluminum compound to the cobalt compound is preferably in a range from 0.5 to 50, more preferably, from 0.2 to 10.

In the preparation of the catalyst component solution it is preferred for the cobalt compound to be first dissolved in the inert organic solvent in the presence of the polyene monomer and then for the organoaluminum compound to be added to the solution. However, very satisfactory results can also be obtained when the organoaluminum compound is added first.

In the preparation of this catalyst component solution the organoaluminum compound should not be allowed to come in contact with water. This is because water can completely decompose such organoaluminum compounds. Accordingly, it is preferable that the inert organic solvent to be used to prepare the catalyst component solution be preliminarily dehydrated at least up to a content of water which is insufficient to completely decompose the entire amount of the organoaluminum compound.

It is preferable that the catalyst component solution be prepared using a dehydrated inert organic solvent. However, a trace of water in the inert organic solvent can be present up to a concentration of about 500 ppm (parts per million by weight). In fact, it is believed that the total elimination of water from such a catalyst component solution is undesirable. It is preferred for no more than 200 ppm of water to be present in the inert organic solvent used in the preparation of the catalyst component solution. If the content of water in the inert organic solvent is larger than 500 ppm, the catalyst component solution has to contain a relatively large amount of the cobalt compound and organoaluminum compound. This results in an economic disadvantage. If a sufficient amount of water is present in the inert organic solvent used in the preparation of the catalyst component solution the catalyst can be completely destroyed.

It is desirable to allow the prereaction used in the preparation of the catalyst component solution to run for a period of at least 30 seconds, and more preferably for at least 1 minute before mixing the catalyst component solution with the 1,3-butadiene/water mixture to form the reaction mixture. Longer time periods can be used without the catalyst component solution losing its activity.

After the catalyst component solution is prepared, it can be added to the high cis-1,4-polybutadiene cement containing 1,3-butadiene monomer. Agitation should be provided in order to ensure that the catalyst component solution and monomer are distributed essentially homogeneously throughout the mixture. The polymerization is initiated by mixing carbon disulfide throughout the rubber cement containing the above-described catalyst component solution.

The amount of carbon disulfide that can be added will vary between 0.005 mole percent and 2 mole percent based on the amount of moles of 1,3-butadiene to be polymerized in the rubber cement. More preferably the amount of carbon disulfide added will vary between 0.001 and 1 mole percent based on the amount of moles of 1,3-butadiene to be polymerized in the rubber cement.

The larger the proportion of the carbon disulfide in a range from about 0.005 to about 0.5% by mole based on the amount by mole of the 1,3-butadiene to be polymerized in the rubber cement, the larger the yield of the polymer product obtained from the polymerization mixture. However, too large an amount of carbon disulfide, for example, larger than 0.5% by mole, causes a decrease in the polymer yield.

The crystallinity and melting point of the SPBD produced can be controlled by adding alcohols, ketones, nitriles, aldehydes, or amides to the polymerization mixture. A detailed description of the agents and techniques that are used to control crystallinity and melting points of SPBD is given in U.S. Pat. Nos. 3,901,868 and 4,153,767. These patents are incorporated herein by reference in their entirety.

The 1,3-butadiene monomer in the polymerization mixture is converted into SPBD while agitating the rubber cement. If the use of an antioxidant is desired, it may be added conveniently at the beginning of the polymerization. This polymerization of 1,3-butadiene monomer can be carried out at a temperature from about $-20°$ C. to about 90° C. It is preferable for the polymerization temperature to be carried out at 0° C. to 40° C. The most preferred polymerization temperature is about 10° C.

This polymerization can be carried out either under a normal pressure or in a pressurized system. This polymerization of 1,3-butadiene monomer into SPBD can be carried out under a nitrogen atmosphere with good results. Such a polymerization can be run for a period of from about 1 to about 30 hours. It is generally preferred for the polymerization to be run for about 10 hours. However, the optimum polymerization time will vary greatly with the polymerization temperature, catalyst, the amount of catalyst used, etc. This polymerization of 1,3-butadiene monomer into SPBD can, of course, be done on a continuous basis.

The polyisoprene cement utilized in such inverse phase polymerizations can be synthesized employing standard techniques. For example, the polyisoprene cement can be made by polymerizing isoprene into polyisoprene in an organic solvent with a titanium tetrachloride/trialkylaluminum catalyst in the presence of polyhalogenated lower aliphatic or cycloaliphatic hydrocarbons. The organic solvent utilized will normally be a saturated aliphatic hydrocarbon or an aromatic hydrocarbon. Some representative examples of suitable aromatic solvents include benzene, toluene, xylenes, ethylbenzene, diethylbenzene, isobutylbenzene, and the like. Some representative examples of suitable aliphatic solvents include n-hexane, cyclohexane, methylcyclohexane, isohexanes, n-heptane, n-octane, isooctanes, n-decane, 2,2-dimethylbutane, petroleum ether, kerosene, petroleum spirits, petroleum naphtha, and the like. However, it will normally be desirable to select a solvent which is inert with respect to the catalyst system which will be employed to initiate the polymerization reaction.

The polymerization medium utilized will normally contain from about 5 weight percent to about 35 weight percent monomers and polymers based upon the total weight of the polymerization medium. Accordingly, the rubber cement ultimately produced will contain from about 5 weight percent to about 35 weight percent polymers based upon the total weight of the rubber cement. The polymerization medium or polymer cement will preferably contain from about 10 percent to about 30 percent monomers and polymers. It will generally be more preferred for the polymerization medium or polymer cement to contain from about 15 weight percent to about 25 weight percent monomers and polymers. In commercial operations, the polymerization medium or rubber cement utilized will typically contain about 20 weight percent monomers and polymer.

After the SPBD has been synthesized in the polyisoprene rubber cement, the rubbery polyisoprene and the SPBD can be simultaneously coagulated from the organic solvent in the rubber cement. The blend recovered is a highly dispersed blend of the crystalline SPBD through the rubbery polyisoprene. Residual amounts of solvent in the blend can, of course, be removed by evaporation or other suitable techniques.

Highly dispersed blends of SPBD in rubbery elastomers can also be prepared utilizing SPBD latex as the polymerization medium for producing emulsion rubbers. Such highly dispersed blends can also be prepared by mixing SPBD latex with the latex of a rubbery elastomer prior to coagulation. The coagulation of such blended latices results in the formation of a highly dispersed blend of SPBD throughout the rubbery elastomer. Such techniques are disclosed in U.S. Pat. No. 4,902,741, which is incorporated herein by reference in its entirety.

The highly dispersed blends of SPBD with synthetic polyisoprene made by inverse phase polymerization or another suitable technique will typically contain from about 5 weight percent to about 40 weight percent SPBD, based upon the total weight of the rubber/SPBD blend. Such blends will preferably contain from about 12 to about 25 weight percent SPBD and will more preferably contain from about 16 weight percent to about 20 weight percent SPBD. Such blends can then be mixed with additional rubbers to make the SPBD containing rubber compounds utilized in accordance with this invention.

The SPBD containing rubber compounds utilized in accordance with this invention will typically contain from about 25 weight percent to about 75 weight percent natural rubber. It is preferable for such rubber compounds to contain from about 30 weight percent to about 70 weight percent natural rubber with compounds contain from about 40 weight percent to about 60 weight percent natural rubber being most preferred. Such rubber compounds can additionally contain up to about 40 weight percent general purpose rubbers, such as polydiene rubbers other than natural rubber. Such polydiene rubbers are derived from conjugated diene monomers and/or nonconjugated diene monomers. Such conjugated and nonconjugated diene monomers typically contain from 4 to about 12 carbon atoms and preferably contain from 4 to about 8 carbon atoms.

Some representative examples of suitable diene monomers include 1,3-butadiene, isoprene, 2,3-dimethyl-1,3-butadiene, 2-methyl-1,3-pentadiene, 3,4-dimethyl-1,3-hexadiene, and the like. Such polydiene rubbers can also contain various vinyl aromatic monomers, such as styrene, 1-vinylnaphthalene, 2-vinylnaphthalene, α-methylstyrene and the like. Some representative examples of suitable polydiene rubbers include cis-1,4-polybutadiene, medium vinylpolybutadiene, styrene-butadiene rubber (SBR), synthetic polyisoprene, isoprene-butadiene rubber, isoprene-butadiene-styrene rubber, and nitrile rubber.

The SPBD containing rubber compounds utilized in building tires in accordance with this invention are typically prepared by mixing a highly dispersed blend of SPBD throughout a rubber prepared by inverse phase polymerization with additional desired rubbers, including natural rubber. Such a mixing procedure can be carried out utilizing standard mixing techniques, such as mixing in a Banbury mixer or a mill mixer. Typically, from about 25 weight percent to about 75 weight percent of the highly dispersed blend of SPBD in the rubbery elastomer will be mixed throughout from about 25 weight percent to about 75 weight percent of the natural rubber. For instance, a blend containing 18 weight percent SPBD and 82 weight percent synthetic polyisoprene could be mixed with natural rubber utilizing a 1:1 ratio to produce a blend containing 9 weight percent SPBD in synthetic polyisoprene and natural rubber.

In the practice of this invention, the SPBD containing rubber compounds utilized in building tires will also contain conventional compounding ingredients such as carbon black, sulfur, accelerators, antidegradants, zinc oxide, processing oil and fatty acids and/or metal salts thereof, such as stearic acid or zinc stearate. For instance, such a SPBD containing rubber composition might include from about 0 to about 10 phr processing oil, from about 20 to about 70 phr of carbon black, from about 2 to about 10 phr of zinc oxide, from about 1 to about 5 phr of fatty acids, from about 0.5 to about 2 phr of cure accelerators, and from about 0.5 to about 5 phr of sulfur. The term "phr" refers to parts by weight of the specified material or ingredient per 100 parts by weight of rubber. For purposes of this patent application, SPBD is assumed to be rubber even though it is actually a thermoplastic polymer.

Tires manufactured in accordance with this invention are built utilizing standard building techniques. Additionally, tires manufactured utilizing SPBD containing rubber compounds are cured in a conventional manner. The tires of this invention are comprised of a toroidal shaped fabric reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass. However, these tires include one or more SPBD containing rubber compounds. The tire components in which SPBD containing rubber compounds can be utilized in accordance with this invention include gum strips around the edges of the belts, an undertread gum layer and the rubber utilized in preparing the fabric reinforced belt. SPBD containing gum strips are typically applied on the top of the edges of the first belt ply which is the most inwardly located belt ply (located closest the carcass and farthest from the tread).

Such gum strips can be situated in and around the edges of the belt plies as gum layer. Belts made utilizing SPBD containing compounds are in all other respects conventional. Undertread gum layers made utilizing SPBD containing compounds are also prepared and built into the tire utilizing conventional techniques. The thickness of such undertread gum layers can vary considerably. However, such undertread gum layers will typically have a thickness which is within the range of about 0.005 inches to 0.2 inches. The undertread gum layer will preferably have a thickness of 0.01 to about 0.05 inches and will more preferably have a thickness which is within the range of about 0.015 inches to about 0.03 inches.

The tire can be built, shaped, molded and cured by various methods which will be readily apparent to those having skill in the art.

The tread rubber is typically a sulfur vulcanized high unsaturation diene rubber, or blend thereof. Representative of such high unsaturation rubbers, are natural rubber and synthetic rubbery polymers of cis 1,4-polyisoprene, cis 1,4-polybutadiene, vinyl 1,2-polybutadiene, styrene/1,3-butadiene copolymer and medium vinyl styrene/1,3-butadiene copolymer rubber.

The styrene/1,3-butadiene rubber can be of the aqueous emulsion polymerization or the hydrocarbon solvent solution polymerization derived types and conventionally contains about 5 to about 15, usually about 8 to 12 percent vinyl 1,2-content. The medium vinyl styrene/1,3-butadiene rubber contains about 15 to about 50, preferably about 20 to about 45 percent vinyl 1,2-content of the type usually prepared by solution polymerizing the monomers in the presence of a polar modifier.

The supporting carcass rubber is typically at least one sulfur vulcanized high unsaturation diene rubber, or blend thereof. Representative of such rubbers are natural rubber (cis-1,4-polyisoprene), cis 1,4-polybutadiene and styrene/butadiene rubber.

The belt can typically be applied in the building of the green tire in which the uncured belt is built prior to the tread member following which the green tire is shaped and cured.

It is understood that the tire carcass rubber, which supports the tread may contain filament reinforcement and additives to enhance rubber adhesion to the filaments. Such filaments can be selected from at least one of metal, organic and inorganic filaments and are conventionally in the form of a twisted cable, or cord, of a multiple of such filaments.

The term "pneumatic tire" is used herein to refer to tires of both the pneumatic and semi-pneumatic type. Conventionally, pneumatic tires rely upon an internal air pressure to maintain its shape when mounted on a rim and placed under load, whereas a semi-pneumatic tire, although containing a gas such as air which might be under pressure in the tire cavity, does not completely rely upon the gas for support of the tire itself.

The practice of this invention is further illustrated by reference to the following examples which are intended to be representative rather than restrictive of the scope of the invention. Unless otherwise indicated, all parts and percentages are by weight.

EXAMPLES 1 AND 2

In this experiment a standard coat/belt stock was prepared (Example 1) and compared with a similar coat/belt stock which was made utilizing a rubber compound containing SPBD. The coat/belt compound made in Example 1 was comprised of 100 parts natural rubber, about 65 parts of fillers, about 1 part of accelerator, about 5 parts of sulfur and about 1 part of antioxidant. The compounded rubber made was cured utilizing standard techniques and tested for mechanical properties. The mechanical properties of the cured rubber is reported in Table I.

In Example 2 a highly dispersed blend containing 18 weight percent SPBD and 82 weight percent synthetic polyisoprene was prepared by inverse phase polymerization. Fifty parts of the SPBD/polyisoprene blend was mixed with 50 parts of natural rubber. The blend made accordingly contained 9 weight percent SPBD which was dispersed throughout the natural rubber and synthetic polyisoprene. It was compounded and cured utilizing the same procedure as was carried out in Example 1. The physical properties of the cured SPBD containing blend are reported in Table I.

| Example | 1 | 2 |
|---|---|---|
| Modulus MPa | 3.0 | 6.4 |
| Tensile Strength MPa | 23 | 19 |
| Elongation % | 475 | 320 |
| Rebound (Avg.) % | 62 | 56 |
| Bending Stiffness (5% Strain) | 23 | 58 |
| Cut Growth (Demattia) mm | 17 | 3 |
| Rheometer, Maximum Torque | 70 | 95 |

As can be seen by reviewing Table I, the modulus of the coat/belt compound was greatly improved by incorporating SPBD therein. A tremendous improvement in cut growth was also observed. The coat growth reported in the average cut growth for a test period of 240 minutes as measured utilizing ASTM D813. An excellent increase in bending stiffness was also achieved by incorporating the SPBD into the rubber compound. Some loss in tensile strength, elongation, and average rebound was observed. However, the loss of tensile strength, elongation and rebound were all well within acceptable limits.

This experiment clearly shows that SPBD containing compounds have an excellent combination of physical properties for utilizing in undertread gum layers, gum strips for utilization in and around the edges of belt plies, and in belts.

EXAMPLE 3

In this experiment, the procedure utilized in Example 2 was repeated except that the SPBD utilized was made by suspension polymerization and ground to a small particle size. The small particle size SPBD was then blended by mechanical mixing into the rubber. After curing, a modulus of 4.5 MPa was achieved. This experiment clearly shows that superior results are attained when the SPBD is prepared utilizing inverse phase polymerization.

EXAMPLE 4

In this experiment a P195/75R14 tire of the Vector ® design was built utilizing standard procedures except that an undertread gum layer having a thickness of 0.015 inches was utilized in place a standard nylon overlay. The undertread gum layer was prepared utilizing the procedure described in Example 2. The tire built utilizing the undertread gum layer in lieu of the nylon overlay proved to be satisfactory in all respects. In fact, the tire built utilizing the SPBD containing undertread gum layer compared very favorably in high speed testing to standard tires which contain the conventional nylon overlay.

The tires built were tested to failure on a dynamometer. In the test procedure utilized, the tires were rotated at an equivalent speed of about 99 miles per hour for 10 minutes. The speed at which the tires were rotated was increased by 6.2 miles per hour (10 kilometers per hour) every 10 minutes. The tires failed at a speed of about 137 miles per hour. This compares very favorably to standard tires of the same design containing a standard nylon overlay which typically fail at speeds of less than 137 miles per hour. For instance, three standard tires were tested and two of them failed at a speed of 130 miles per hour.

This example shows that undertread gum layers which are comprised of SPBD containing rubber compounds can be utilized in lieu of overlays in building high performance tires. By eliminating the overlay, very significant cost savings can be realized. These savings are attributable to lower labor costs and lower material costs.

EXAMPLE 5

This experiment was conducted to show that improved performance can be realized by utilizing SPBD containing rubber compounds in gum strips, an undertread gum layer, and in belt rubber. In the procedure utilized, P225/60VR16 tires of the Eagle GT+4® design were built. However, overlays were not included in the tires but the SPBD rubber composition made by the process specified in Example 2 was utilized in preparing gum strips which were applied to the top of the edges of the first belt ply. The tires built utilizing this procedure failed in the high speed test described in Example 4 at a speed of about 130 miles per hour.

Additional tires were built utilizing gum strips which were comprised of the SPBD rubber composition and an undertread gum layer which was also comprised of the rubber composition containing SPBD. Additionally, the tires made were built utilizing shoulder wedges lying under the belt at both edges which were comprised of the rubber composition containing SPBD. Of the three tires built utilizing this procedure, one failed at 130 miles per hour and two failed at 136 miles per hour. Accordingly, better performance can be realized by utilizing SPBD in both the undertread gum layer and in the gum strip.

Three additional tires were built utilizing the SPBD rubber composition as the rubber for the belts as well as the rubber for the undertread and gum strip. All of the tires built utilizing this procedure failed at 136 miles per hour. This experiment clearly shows that advantages can be realized by utilizing SPBD containing rubber compositions as the rubber from which belts are comprised. It further shows the advantage of utilizing such compounds in the gum strip, undertread gum layer and in belts.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic rubber tire comprised of a toroidal shaped fabric-reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass where the rubber of said belt is comprised of (A) from about 25 to about 75 weight percent of a highly dispersed blend of syndiotactic 1,2-polybutadiene in synthetic polyisoprene, wherein said highly dispersed blend contains from about 5 weight percent to about 40 weight percent syndiotactic-1,2-polybutadiene, and wherein said highly dispersed blend was made by inverse phase polymerization, (B) from about 25 to about 75 weight percent natural rubber, and (C) from 0 to about 40 weight percent polydiene rubbers other than natural rubber.

2. A pneumatic tire comprised of a toroidal shaped fabric-reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass and an undertread gum layer positioned between said tread and said belt where the undertread gum layer is comprised of (A) from about 25 to about 75 weight percent of a highly dispersed blend of syndiotactic 1,2-polybutadiene in synthetic polyisoprene, wherein said highly dispersed blend contains from about 5 weight percent to about 40 weight percent syndiotactic-1,2-polybutadiene, and wherein said highly dispersed blend was made by inverse phase polymerization, (B) from about 25 to about 75 weight percent natural rubber, and (C) from 0 to about 40 weight percent polydiene rubbers other than natural rubber.

3. A pneumatic rubber tire comprised of a toroidal shaped fabric-reinforced rubber carcass and an outer circumferential rubber tread, two spaced substantially inextensible beads and two sidewalls extending radially from and connecting said tread to said beads, said tire characterized by having a circumferential fabric reinforced rubber belt positioned between said tread and supporting carcass with gum strips around the edges of the belts where the gum strips are comprised of (A) from about 25 to about 75 weight percent of a highly dispersed blend syndiotactic 1,2-polybutadiene in synthetic polyisoprene, wherein said highly dispersed blend contains from about 5 weight percent to about 40 weight percent syndiotactic-1,2-polybutadiene, and wherein said highly dispersed blend was made by inverse phase polymerization, (B) from about 25 to about 75 weight percent natural rubber, and (C) from 0 to about 40 weight percent polydiene rubbers other than natural rubber.

4. A pneumatic rubber tire as specified in claim 2 wherein said undertread gum layer is comprised of from about 30 to about 70 weight percent of said highly dispersed blend of syndiotactic 1,2-polybutadiene in synthetic polyisoprene.

5. A pneumatic rubber tire as specified in claim 2 wherein said undertread gum layer is comprised of from about 40 to about 60 weight percent of said highly dispersed blend of syndiotactic 1,2-polybutadiene in synthetic polyisoprene.

6. A pneumatic rubber tire as specified in claim 4 wherein the undertread gum layer is comprised of from about 30 to about 70 weight percent natural rubber.

7. A pneumatic rubber tire as specified in claim 5 wherein the undertread gum layer is comprised of from about 40 to about 60 weight percent natural rubber.

8. A pneumatic rubber tire as specified in claim 6 wherein the syndiotactic 1,2-polybutadiene has a melting point of at least about 180° C.

9. A pneumatic rubber tire as specified in claim 6 wherein the syndiotactic 1,2-polybutadiene has a melting point of at least about 200° C.

10. A pneumatic rubber tire as specified in claim 6 wherein the polydiene rubber is medium vinyl polybutadiene.

11. A pneumatic rubber tire as specified in claim 4 wherein the undertread gum layer is from about 0.01 inches to about 0.05 inches thick.

12. A pneumatic rubber tire as specified in claim 4 wherein the undertread gum layer is from about 0.015 to about 0.03 inches thick.

13. A pneumatic rubber tire as specified in claim 1 wherein the highly dispersed blend of syndiotactic 1,2-polybutadiene in synthetic polyisoprene contains from about 12 to about 25 weight percent syndiotactic 1,2-polybutadiene.

* * * * *